May 17, 1938.  R. P. CABLE ET AL  2,117,788
AEROPLANE PROPELLER
Filed April 17, 1936   3 Sheets—Sheet 1
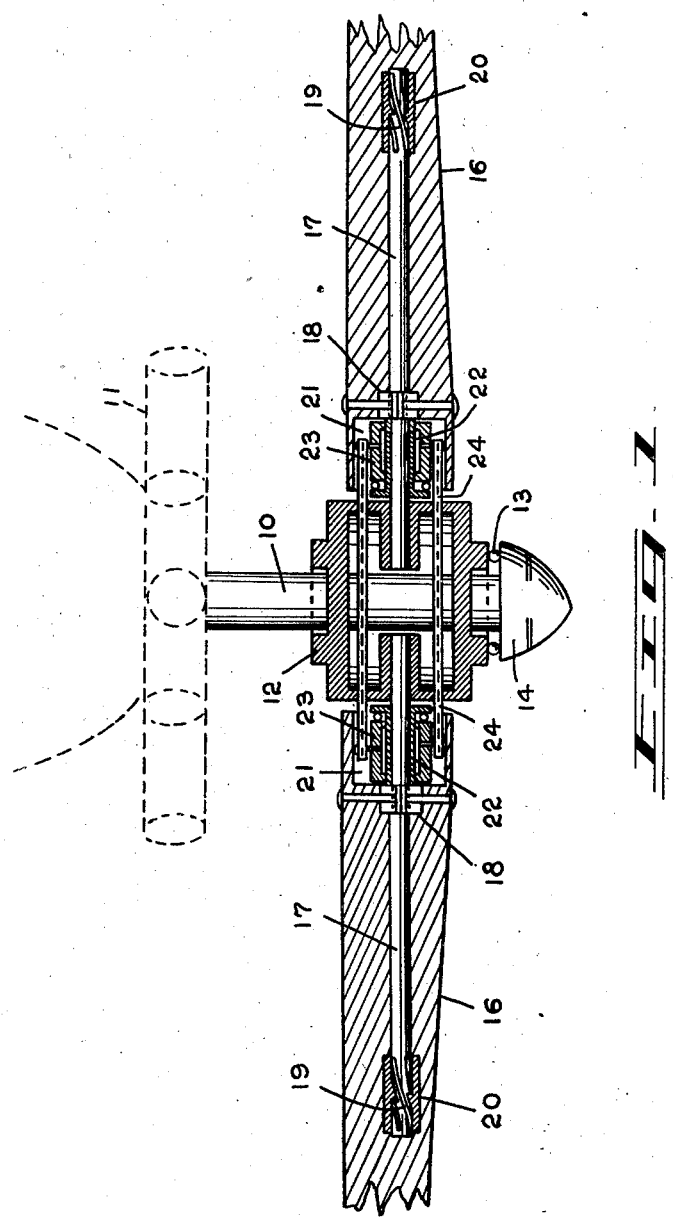
INVENTOR
Roy P. Cable, Manly Cable and
Cecil Cable
By Ralph Burch

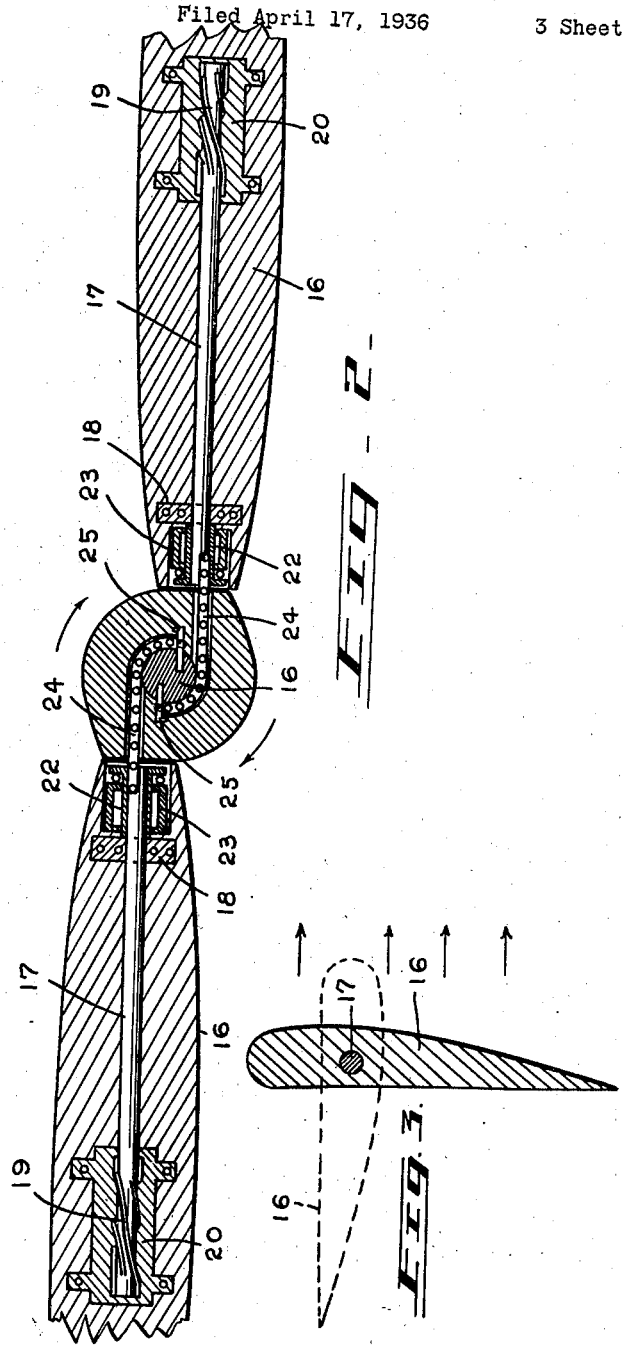

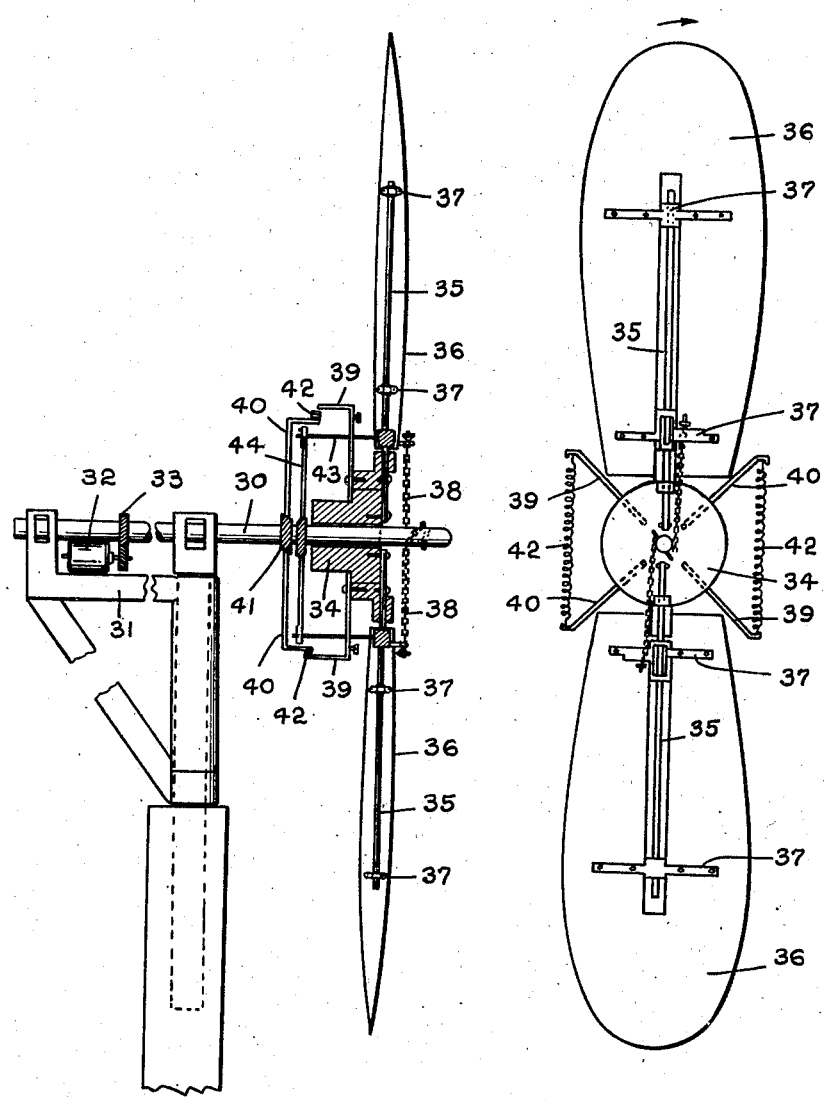

Patented May 17, 1938

2,117,788

UNITED STATES PATENT OFFICE

2,117,788

AEROPLANE PROPELLER

Roy Percy Cable, Manly Cable, and Cecil Cable, Macklin, Saskatchewan, Canada

Application April 17, 1936, Serial No. 74,999
In Canada April 18, 1935

3 Claims. (Cl. 170—162)

This invention relates to improvements in a propeller wherein the pitch thereof is variable. Said propeller being constructed either to be driven as in the case of an aeroplane propeller or to drive as in a windmill wheel, the basic principles of the device being applicable to both types.

A further object of the invention is to design and construct a propeller or wind wheel incorporating therewith mechanism conjoined to the blades thereof whereby the pitch of the said blades will be automatically varied according to the speed of rotation.

A still further object of the invention is to design and construct a propeller or wind wheel wherein the centrifugal force of the blades created by their rotation is adapted to vary the pitch of the propeller.

With these and other objects in view that may appear while the description proceeds the invention consists in the novel construction and arrangements of parts as hereinafter more specifically set forth, claimed and shown in the accompanying drawings forming part of this application and in which—

Fig. 1 is a plan in partial cross-section of my improved propeller.

Fig. 2 is a sectional elevation of the device.

Fig. 3 is a diagrammatic view showing the pivotal movement of the blade.

Fig. 4 is a side elevation partially in section of the service adapted to a windmill wheel construction.

Fig. 5 is a front elevation thereof.

Referring more in detail to the drawings wherein similar reference characters designate corresponding parts throughout the several parts it will be seen the invention comprises a main shaft 10 connected to the engine 11. Rotatably mounted on the said shaft is a hub casing 12 having suitable antifriction bearings and thrust bearings 13 between the same and the bullet nosed enlargement 14 on the end of the shaft. The propeller blades 16 are flexibly connected to the casing 12 by means of shafts 17 which are fixed radially therein. Said shafts extend outward centrally through the propeller blades which are fixed thereon rotatable and slidable. Suitable bearings 18 are provided and the end of the shaft is constructed with a twisted spline or slow spiral thread 19 of predetermined pitch and a cooperating threaded member 20, positioned in the blade in fixed relation thereto and arranged to engage the thread of the shaft 17. From this construction it will be understood that a slight lateral movement of the blades on the shafts will result in a corresponding predetermined rotation of each blade upon its axis namely—the said shaft. With this in mind the operation of the device will be more readily understood.

At the inner end of each blade is a recess 21 in which a bearing 22 is enclosed. Said bearing is slidably mounted on the shaft 17 and fixed to the blade structure 16 by welding or otherwise affixing the inner end of the bearing 22 to the bearing 18. On this bearing is a sleeve 23 in rotatable relation thereto but arranged to move laterally therewith. Connected to the said sleeve are chains 24 which extend in through the hub casing 12 to the shaft 10 to which they are anchored in a secure manner. It will be seen from Fig. 2, that pins 25 are used for this purpose and that they are fixed into the shaft in a manner that the chains from the blades are fixed therein on opposite sides of the shaft.

From the foregoing it will be seen that when the shaft 10 is revolved in the direction of the arrows by means of the engine the entire structure will also revolve the blades assuming their normal position being pulled inward by the chains. As the speed of revolution is increased the blades tend to exert an outward pull on the chains due to centrifugal force. This causes the whole propeller structure to slightly advance in its position relative to the shaft 10 and at the same time the blades move outward laterally on their respective shafts 17. As previously explained this lateral movement causes a slight rotation of the individual blade upon its own axis and thereby changes the pitch of the propeller. When the speed of revolution is decreased the blades will gradually re-assume their normal position again.

Referring to the modified form of the device applicable to wind wheels, the drive shaft 30 is rotatably mounted in a suitable frame 31 and connected to a generator 32 or other device to be driven by suitable gears 33. A hub casing 34 is mounted freely on the shaft and radial shafts or rods 35 are secured rigidly thereto by bolting or other means. The wind wheel blades 36 are pivotally mounted on the said rods by means of bearings 37 and chains 38 are connected to the inner of the bearings and to the shaft 30 around which they are partially wound. The hub 34 is flexibly connected to the shaft by means of arms 39 extending radially therefrom and similar arms 40 which are secured to a collar 41 mounted on the shaft 30 in fixed relation thereto. The arms 39 and 40 are connected together by springs 42 strong enough to allow a slight amount of flexibility therebetween.

In order to rotate the blades on their axis the rod 35 may be equipped with the spiral thread as previously described or rods 43 may be secured to the rear of the blades extending at right angles thereto. Radial rods 44 are fixed on the shaft 30 and arranged to engage the rods 43 when the blades are in their normal position. When in operation the blades will tend to be in advance of the normal position relative to the shaft 30, or in other words the shaft will lag due to the load upon it and permitted by the flexible connection between the blades and the shaft. The blades will also tend to exert an outward pull on the chains causing the same to unwind from the shaft on which they are fastened. As the relative position between the blades and the shaft is changed the rods 43 bear on the rods 44 which, being stationary with respect to the shaft results in the angular movement of the former and a corresponding axial movement of the blades and the pitch or angle of deflection thereof is changed.

From the foregoing description of the aeroplane propeller construction it will be seen that the input of energy to the propeller for a given output is reduced, thereby increasing the efficiency of the propeller. The automatic change in the pitch of the propeller blades acts as a governor for the engine by keeping the same at a normal speed under varying flying conditions. It will also increase flying speed in the stratosphere and therefore be more economical to operate than a standard machine, and will also be of great advantage when taking off giving a quicker start and allowing the plane to rise at a greater angle.

In the adaptation of the invention to windmill wheel construction it will be seen that as the speed of the windmill tends to increase, due to the greater velocity of wind, the blades automatically assume a lesser pitch angle which therefore, tends to reduce the speed of the same and as the wind velocity decreases so the angle of pitch is increased and consequently the rotation speed is likewise increased. This arrangement results in a fairly constant speed for the windmill, having but very slight if any variation between what might be termed maximum and minimum speeds. By design this speed might be changed to suit the requirements of the work which the windmill is expected to perform.

It is believed that the construction and arrangement of the structure shown may be apparent from the foregoing paragraphs taken in conjunction with the accompanying drawings without further detailed description.

While the preferred embodiment of the invention has been disclosed it is understood that minor changes in the details of construction, combination and arrangement of cooperating elements may be resorted to within the scope of what is claimed without departing from the spirit of the invention.

We claim:

1. In an aeroplane propeller comprising a drive shaft having a hub rotatably mounted thereon, oppositely disposed shafts fixed in said hub and extending radially therefrom, propeller blades axially and slidably mounted on said shafts and means to automatically rotate the same about their axis as the structure revolves, said means comprising a spiral thread or spline on the ends of each radial shaft and a corresponding receptacle therefor, positioned in said propeller blades in fixed relation thereto, and means whereby the blades are urged centrally to their normal position, said means being actuated by the relative rotation of the drive shaft and the hub.

2. In an aeroplane propeller comprising a drive shaft having a hub rotatably mounted thereon, radial shafts fixed therein, propeller blades mounted on said radial shafts, means to slightly rotate said blades as they move outwardly and inwardly on their shafts, chains connecting said blades to said drive shaft, said chains being partially wound on said drive shaft and secured thereto, and arranged to unwind as the centrifugal force draws the blades outward during operation.

3. In an aeroplane propeller comprising a drive shaft having a hub rotatably mounted thereon, radial shafts extending from said hub in opposite directions, propeller blades axially and slidably mounted on said radial shafts, means for rotating said blades as they reciprocate on their shafts and chains having swivelled connection at one end with said blades and their opposite end partially wound on said drive shaft and connected thereto, said chains being actuated by the relative rotation of the hub and the drive shaft to counteract the centrifugal force on the blades.

CECIL CABLE.
ROY PERCY CABLE.
MANLY CABLE.